May 13, 1930.  B. M. SHIPLEY  1,758,861

CASH REGISTER

Filed May 5, 1919   4 Sheets-Sheet 4

Inventor
BERNIS M. SHIPLEY

Patented May 13, 1930

1,758,861

UNITED STATES PATENT OFFICE

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed May 5, 1919. Serial No. 294,966.

This invention relates to improvements in cash registers and has more particular relation to the type of cash registers shown and described in Letters Patent of the United States issued to Thomas Carney No. 497,860 on May 23, 1893, and to Joseph P. Cleal No. 786,346, issued April 4, 1905, and No. 773,060, issued October 25, 1904.

The general operation and construction of the machine shown in the present application are substantially like those of the machine shown in the Carney and Cleal patents above mentioned and particularly the Cleal patent.

The general object of this invention is to provide a machine which will enable a proprietor selling taxable goods to keep an account of the sale of all goods sold, including goods upon which there is placed a Government tax and goods upon which no tax is assessed, and also to keep an account of the proper tax which is collectable by the revenue department of the Government on the sale of such taxable goods. In the accomplishment of this object the machine is constructed to enable the proprietor to register the amount of the purchase, the machine automatically registering the amount of the proper tax to be applied to that purchase, the amount of the tax being based upon the amount of the purchase. A further object of the invention is the provision of mechanism not only for the registration of the amount of the purchase and the automatic registration of the amount of tax assessable on the purchase, but also mechanism to make a printed record of the purchase together with a printed entry to indicate whether or not a tax has been registered in connection with the purchase and also to indicate the amount of purchase together with the proper amount of tax, and further to indicate as to whether or not the tax has been registered.

As it frequently occurs that a sale of goods on which no tax is assessed is to be handled by the same cash register as that which handles the sales of taxable goods, the machine is constructed to enable the proprietor to make a record of the sale of non-taxable goods and also to make a record of the fact that no tax has been registered in connection with the sale.

With these and incidental objects in view the invention consists in certain novel feature of construction and combinations of parts, the essential elements of which are set forth in appended claims and a preferred form or embodiment of which is hereinafter described with reference to the drawings which accompany and form part of this specification.

The machine in general includes keys, depressible singly or in combination, to represent the amount of the purchase. Additional keys are also provided representing special transactions such as "Received on account", "Charge", "Paid out" and "No sale". When the keys representing the amount of purchase are depressed the amount of the purchase is automatically registered in the totalizer provided for keeping a total record of all sales made.

A "No tax" key is provided, to be operated when it is desired to enter a sale upon which no tax is to be assessed. When a taxable sale is made, the "No tax" key is not operated. Consequently, the amount of tax is automatically registered upon a "Tax" totalizer, while the amount of the purchase is registered on the proper "Purchase" totalizer. If no tax is to be recorded, the "No tax" key is pressed which results in the disabling of the "Tax" totalizer. Consequently when an amount is registered by the operation of a "Purchase" key, that amount will be registered on the "Purchase" totalizer but no tax wil be registered on the "Tax" totalizer.

Proper indicating mechanism is provided for indicating the amount of every purchase and the class of transaction, that is, whether it is a "Charge", "Received on account", "Paid out", or "No sale". An indicator is also provided to indicate whether or not a tax is registered.

Suitable printing mechanism is provided for printing upon a detail strip the amount of every purchase, accompanied by a character indicating the class of transaction, as well as a character indicating when a tax has been automatically registered in connection with that transaction.

Described in detail the machine includes (Figs. 1A and 1B) a series of amount or purchase keys 20, a "No tax" key 21, a "Received on account" key 22, a "No sale" key 23, a "Charge" key 24 and a "Paid out" key 25. All of the keys 20 and 22 to 25, inclusive, are pivotally mounted upon a transverse rod 26 (Figs. 5 and 9) supported in the side frames 27 and 38. Common to all of the keys 20, and 22 to 25 inclusive, is a key coupler 28 pivoted on studs 29 at each end in the side frames 27 and 38, and normally resting on the rear ends of the amount or purchase keys 20 and "No sale" key 23. Each of the pivoted keys is provided with a notch 30 which is adapted to cooperate with a lip 31 formed on the rear edge of the key coupler 28 when any one of the pivoted keys is depressed at its outer end.

Figures 8, 9:
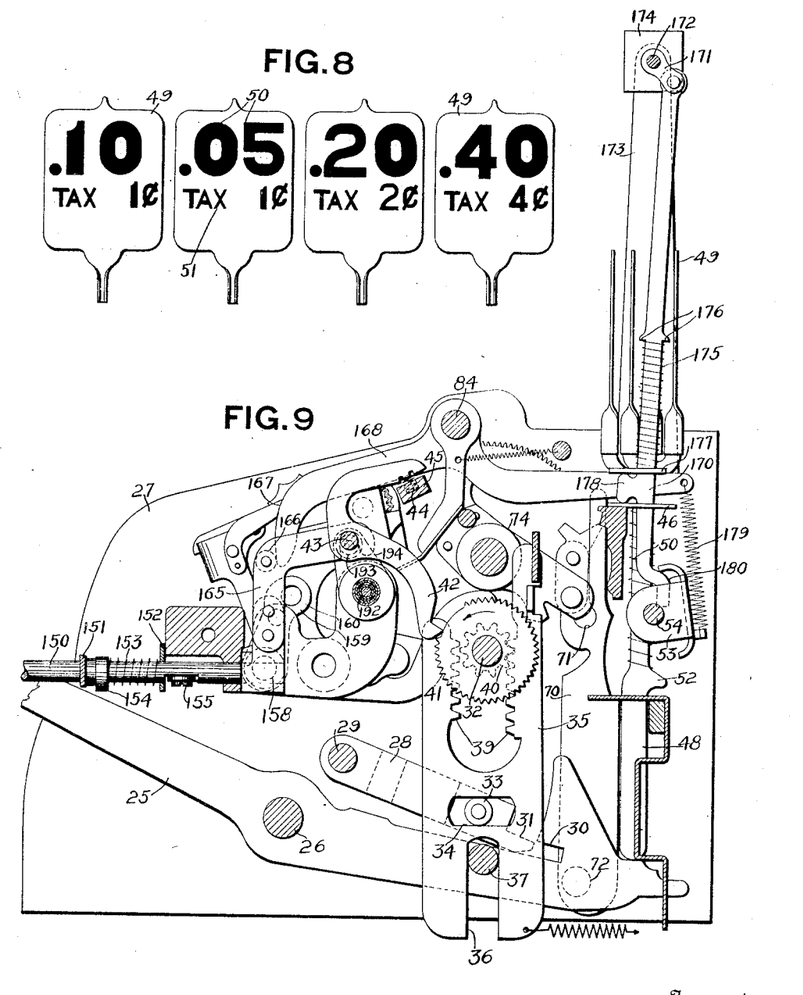
Fig. 8 is a plan view showing a group of indicators for indicating both the amount of the purchase and the tax appropriate thereto.
Fig. 9 is a section of the machine taken just inside of the right hand side frame on the line 9—9 of Fig. 1B.

Suitably mounted in side frames 27 and 38 is a transverse shaft 32 which is adapted to be given a complete rotation upon each reciprocation of the key coupler 28 by a mechanism shown in Fig. 9. By referring to said figure it will be noted that at its right hand end the key coupler 28 is provided with a stud 33 which projects into an elongated slot 34 in a vertically reciprocable double rack 35. At its lower end the double rack 35 is provided with an open slot 36 into which projects a stud 37 mounted on the right hand side frame 38. At its upper end the rack 35 is also slotted and on the walls of the slot the rack 35 is furnished with oppositely facing rack teeth 39 which cooperate with a pinion 40 fast on the shaft 32. This mechanism is substantially the same in construction and operation as the mechanism shown in the aforesaid Carney and Cleal patents and for the accomplishment of the same purpose, that is, completely rotating the shaft 32 on each reciprocation of the key coupler 28, the rotation being in the direction of the arrow shown in Figs. 5 and 9. To prevent a retrograde movement of the shaft 32, a ratchet or full stroke disk 41 is secured to the right hand end of the shaft 32 and cooperates with the full stroke pawl or lever 42, pivoted at 43 to the right hand frame 38 of the machine, and held in engagement with the ratchet 41 by a spring 44, seated in a lug 45 on the right hand side frame 38

It will thus be seen that upon each complete depression of one of the pivoted key levers, the key coupler 28 will be reciprocated and, through the connections shown in Fig. 9, and just above described, a complete single rotation will be given to the shaft 32.

The function of the key coupler 28, as is well known in the art, is to permit the starting of an operation of two or more keys, for example, the "$1" key and the "20¢" key and then the completion of the operation by pressing either one of the keys. By reason of the engagement of the lip 31 of the key coupler 28 with the notches 30 in the keys, both the "$1" key and the "20¢" key will be fully operated by the complete depression of either of one of the two.

The keys 22, 24 and 25 differ slightly in construction from that of the amount keys so as to permit a partial depression of one of those keys prior to the operation of the regular purchase keys. They embody what is known in the art as a "flexible key" construction, one form of which is fully shown and described in the aforesaid Cleal patent. Other forms are substantially that shown in the United States Letters Patent to E. J. Hall, No. 875,661 dated December 31, 1907 and to W. G. Doty, No. 823,516, dated June 19, 1906. As the flexible key construction above mentioned does not enter into the present invention, illustration and description of the same in detail will not be embodied herein but reference may be had to any of the above mentioned patents for a detailed illustration and description of the same.

*Indicating mechanism*

Resting on the rear end of each of the keys 20 and 22 to 25 inclusive and held in vertical positions by guides 46 and 47 (Fig. 5) is an indicator rod 48 which carries at its top one of a series of indicating tablets 49 of a type fully shown and described in the hereinbefore mentioned Carney and Cleal patents. The indicator rods 48, when not in operated position, are yieldingly held in their lowermost positions by springs 50 so that the lower ends of all of the indicator rods 48 are in contact with the rear ends of the pivoted key levers. Each of the indicators 49 bears a special character or characters which are preferably identical with the character or characters appearing on the forward ends of their appropriate pivoted keys. As shown in Fig. 8, each of the indicator tablets 49 appropriate to the purchase keys bears characters 50 representing the value of the key to which the indicator is assigned. In addition just below the character 50 the indicator tablet bears the legend "Tax", marked 51 on Figure 8, with the amount of the tax on a sale of the value of the character 50, following the word "Tax". Thus in case the tax amounts to one cent on each ten cent purchase, or fraction thereof, the tax indicated on the ten cent indicator tablet is "1¢", on the "20¢" indicator tablet it is "2¢", and on a five-cent indicator tablet it is "1¢". Where two or more keys are used to register the amount of the purchase, such amount is indicated by the separate indicator tablets 49 allotted to those purchase keys. Thus when a sale of 45¢ is registered, the purchase indicator tablets representing the "40¢" and the "5¢" keys are elevated. In this case the tax represented by the "40¢" key is "4¢" and the tax indicated by the "5¢" key is "1¢", thus making a total purchase of "45¢" and a total tax of "5¢".

The special keys 22 to 25 inclusive are each provided with indicator tablets 49 which preferably bear characters corresponding to the characters on the outer or forward ends of the key levers.

When keys are depressed, corresponding indicator rods 48 (Fig. 5) will be elevated against the tension of the indicator springs 50 carrying the tablets 49 upwardly until a projection 52 carried by the indicator rods passes above a rocking bail 53 pivoted at 54 at each end to the side frames 27 and 38. The construction and operation of the bail 53 are old and well known in the art and will not be described in detail here. It is sufficient to state that the function of the bail 53 is to hold the indicator rods 48 appropriate to the depressed keys in elevated positions between operations of the machine so as to sustain an indication between operations of the machine thereby showing which keys were depressed in the previous operation. It will thus be seen that when any one of the pivoted key levers is depressed, the proper indicator tablet 49 will be raised and publicly exposed through sight openings in the cabinet which are commonly provided in cash registers so as to indicate which one of the key levers have been operated.

Totalizers

Figure 1A:
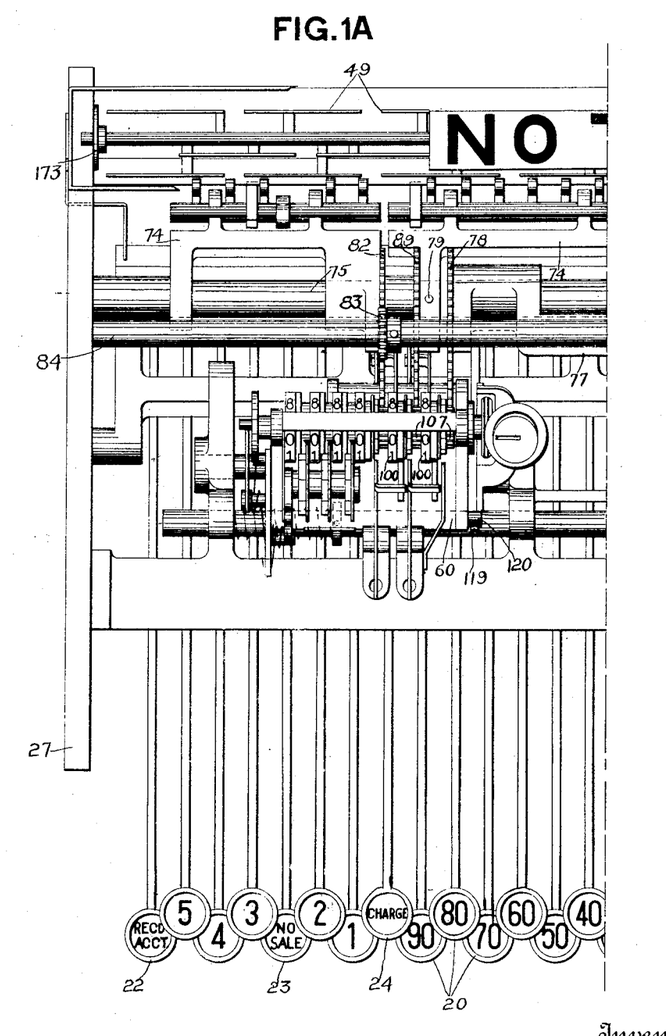
Fig. 1A and 1B taken together constitute a top plan view of the machine with the cabinet and certain parts of the mechanism omitted for the sake of clearness.
Figure 1B:
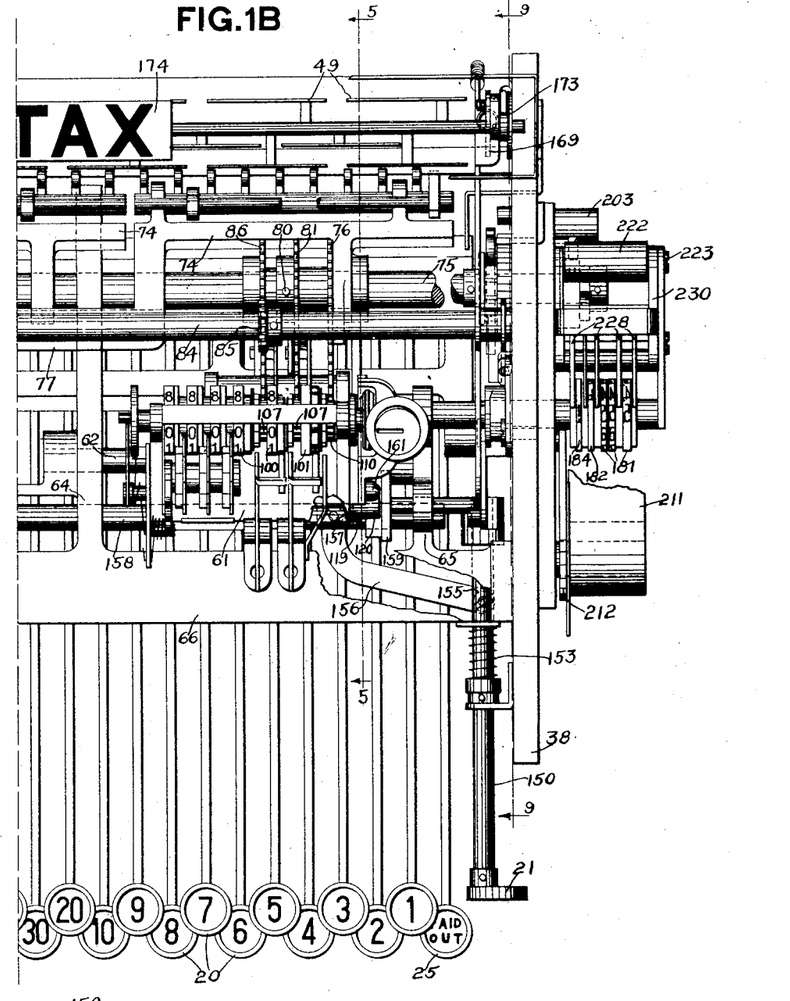
Figure 2:
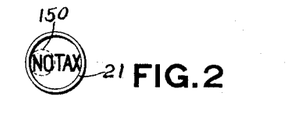
Fig. 2 is a detail front view of the key employed when no tax is to be recorded.

As hereinbefore stated in the early part of the description, the machine is provided with two totalizers 60 and 61 (Fig. 1A and 1B). The two totalizers, as illustrated in a top plan view comprising Figures 1A and 1B, lie side by side in the machine just above the pivoted key levers. The left hand totalizer 60 for convenience will be known as the "Purchase" totalizer as it is upon this totalizer that the amounts of all purchases are registered. The right hand totalizer 61 will be known as the "Tax" totalizer as there is automatically registered upon this totalizer the proper amount of tax which is to be assessed on each entry of purchase against which a tax is assessable.

The construction and operation of the two totalizers 60 and 61 are identical, with the exception of one detail of the "Tax" totalizer 61 which will be hereinafter pointed out, and for convenience the right hand totalizer 61 will be described in detail. It is thought that a description of this totalizer will be sufficient.

Figures 3, 4, 5:
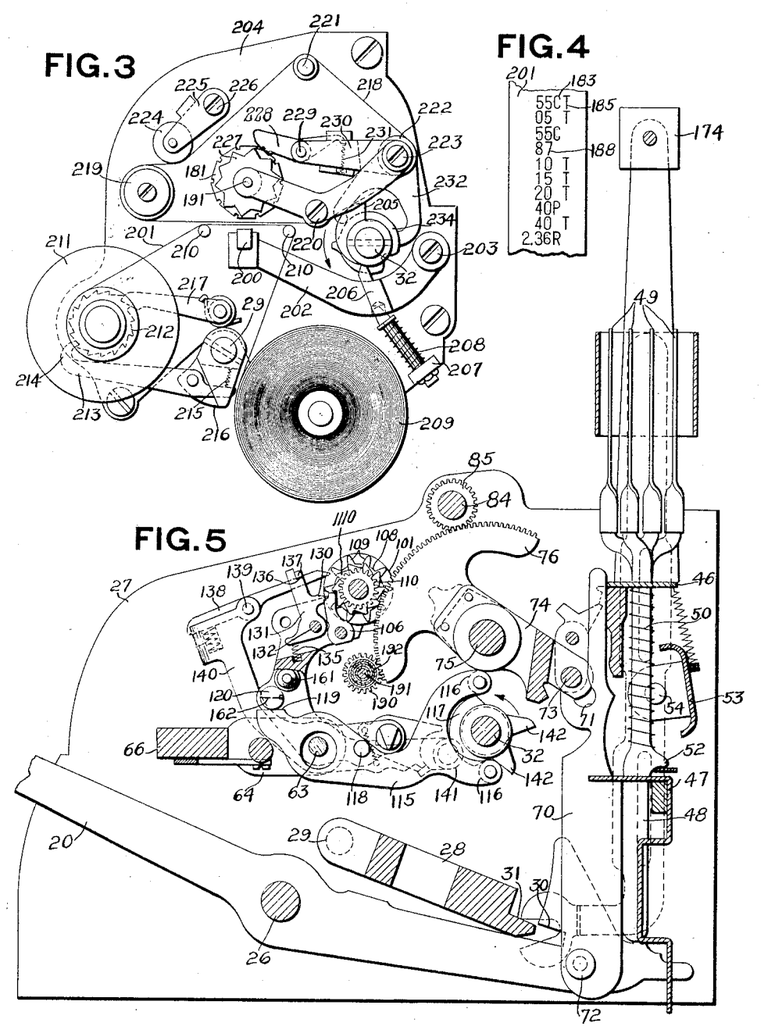
Fig. 3 is an elevation of the printing mechanism on the right hand end of the machine as shown in Fig. 1B.
Fig. 4 is a section of the detail strip printed on the machine.
Fig. 5 is a section of the machine taken on the line 5—5 of Fig. 1B, looking in the direction of the arrows.

The "Tax" totalizer 61 is pivotally mounted on studs 62 and 63 (Figs. 1B and 5). The studs 62 and 63 are suitably supported in brackets 64 and 65 carried by a tie bar 66 (Fig. 1B) extending between the side frames 27 and 38. Pivotally mounted on each of the amount keys 20 (Figs. 5 and 9) is an upwardly extending actuator controller 70 which is formed near its upper end with a notch 71. The notches 71 of the various actuator controllers 70 are located different distances from the pivotal points 72 of the actuator controllers 70, thereby enabling the giving of differential movements to the registering mechanism of the machine by the operation of the various keys 20.

Referring to Figure 5, the notch 71 of each actuator controller 70 is adapted to engage a cross rod 73 when the corresponding key 20 is depressed. There is a series of cross rods 73 each carried by one of a series of rocking frames 74 supported upon a rock shaft 75 suitably mounted in the side frames 27 and 38. A frame 74 is provided for each of the groups of amount keys, that is, one frame for the dollars keys, one frame for the tens of cents or dimes keys, and a third frame for the units of cents or penny keys. It will thus be seen that when any one of the keys 20 is depressed, it will rock its appropriate frame 74 a distance, according to the location of the notch 71 of its appropriate actuator controller 70.

Referring to Figures 1A and 1B, the frame 74 for the penny keys is loosely pivoted upon the rock shaft 75 and has fast thereto near its right hand end an actuator segment 76. The frame 74 of the penny keys is formed with a yoke 77 which extends to the left and at its left hand end carries an actuator segment 78. The actuator segment 76 at the right hand end of the frame 74 of the penny keys is one of a group of actuators appropriate to the "Tax" totalizer, while the actuator segment 78 at the left hand end of the frame 74 is the units actuator segment of the "Purchase" totalizer.

The frame 74, appropriate to the dimes keys is pinned as at 79 to the rock shaft 75. At is left hand end the frame 74 of the dimes keys carries an actuator segment 89 which constitutes the dimes actuator segment of the "Purchase" totalizer. Pinned to the shaft 75 as at 80 (Fig. 1B) is an actuator segment 81 which constitutes the units actuator segment for the units of cents wheel of the "Tax" totalizer.

The actuator frame 74 which is appropriate to the dollar keys and is the left hand frame in Figure 1A, is pivoted on the shaft 75 and has fast to its right hand end an actuator segment 82 which constitutes the dollars actuator segment for the dollars element of the "Purchase" totalizer. Meshing with the actuator 82 is a pinion 83, pinned to a rotary shaft 84 supported in the side frames 27 and 38. The shaft 84 carries near its right hand end a pinion 85 which is fast thereto and meshes with an actuating segment 86 pivoted loosely on the shaft 75 and constituting the actuator for the tens of cents element of the "Tax" totalizer 61.

It will thus be seen that when one of the penny keys is operated, the penny frame 74 will be rocked about the shaft 75 to an extent appropriate to the value of the key depressed. This will adjust the actuators 76 and 78 according to the value of the key depressed. When a dimes key is depressed the dimes frame 74 will be moved according to the value of the key depressed, and in view of the fact that the frame 74 of the dimes keys is pinned to the shaft 75, the rocking movement of the dimes frame 74 will be conveyed to the shaft 75, and through the medium of the shaft 75, this movement will be conveyed to the actuator 81 of the group appropriate to the "Tax" totalizer. At the same time, the actuator 89 of the group appropriate to the "Purchase" totalizer will be adjusted to an extent appropriate to the dimes key actuated. If a dollar key is operated, its appropriate frame 74 will be moved the proper distance, which movement will actuate the actuator 82 for the "Purchase" totalizer and through the medium of the pinion 83, shaft 84 and pinion 85 this movement will be transmitted to the actuator 86 of the group appropriate to the "Tax" totalizer 61.

Each of the totalizers 60 and 61 includes a plurality of totalizer elements 100. In addition, the "Tax" totalizer has a single element 101 for a purpose hereinafter described.

Figure 6:
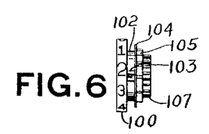
Figs. 6 and 7 are details of an element of the registering mechanism.
Figure 7:
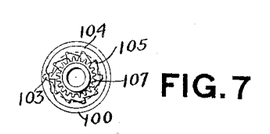

The totalizer elements 100 which are actuated directly from the actuator segments, are each constructed as shown in Figs. 6 and 7, and include a numeral wheel bearing the digits "1" to "9" and "0" inclusive. Pinned to the totalizer element wheel is a transfer disk 102 carrying a single transfer tooth 103 for a purpose hereinafter described. The element 100 carries a spacing disk 104 which is provided to give a proper spacing of parts and prevent an interference of members cooperating with the several parts of the totalizer element. Pinned to the element is a ratchet 105, adapted to cooperate with a spring pressed pawl 106 (Fig. 5) for the purpose of preventing retrograde movement of the element 100. In addition, the units, tens of cents, and the dollars totalizer elements 100 of the purchase totalizer, each carry an actuating pinion 107 (Figs. 6 and 7). The units and tens of cents totalizer elements 100 of the "Tax" totalizer also carry actuating pinion 107.

The element 101 of the "Tax" totalizer is constructed slightly different from the totalizer elements 100 and constitutes an auxiliary actuator for the units of cents totalizer element 100 of the "Tax" totalizer. The element 101 of the "Tax" totalizer (Figure 5) includes a wheel which does not bear the digits as shown on the regular totalizer elements 100 but is perfectly blank. On the side of the wheel of the element 101 of the "Tax" totalizer is a transfer disk 108 which is provided with ten transfer teeth or projections 109. The element 101 is provided with a ratchet 1110 similar to the ratchets 105 of the elements 100 which also cooperates with a spring pressed pawl 106 for the purpose of preventing retrograde movement of the element 101. The element 101 also carries an actuating pinion 110 similar to the actuating pinions 107 of the totalizer elements 100. The spacing disk 104 for this element is omitted from the showing in Fig. 5.

By referring to Fig. 1B it will be noted that the pinion 110 of the element 101 is in operative alignment with the actuator segment 76 fast on the penny frame 74. The penny actuator segment 78 for the "Purchase" totalizer is also fast on the penny frame 74. The penny or right hand totalizer element 100 of the "Tax" totalizer has its operating pinion 107 in operative alignment with the segment 81 fast on the shaft 75. It will be recalled that the segment 81 receives a rocking movement through the medium of the shaft 75 which in turn receives its movement from the frame 74 appropriate to the dimes purchase keys. This dimes frame 74 has fast to it the segment 89 which is in operative alignment with the actuating pinion 107 of the dimes totalizer element 100 of the "Purchase" totalizer 60. The actuating pinion 107 of the dimes totalizer element 100 of the "Tax" totalizer 61 is in operative alignment with the segment 86 which, it will be recalled, receives a rocking movement through the medium of pinion 85, shaft 84, pinion 83 and segment 82. The segment 82 is the dollars segment of the "Purchase" totalizer and is fast on the frame 74 appropriate to the dollar keys.

When registering a transaction involving the sale of an item which is taxable, the "Purchase" totalizer 60 and the "Tax" totalizer 61 are rocked so as to engage the actuating pinions 107 and 110 with their appropriate actuator segments. This rocking movement of the two totalizers is effected in the following manner.

The two totalizers, it will be recalled, are pivotally mounted upon the brackets carried by the tie bar 66. Pivoted on the right hand end of each totalizer, as shown in Fig. 5, is a lever 115 formed with two arms at its right hand end in said figure, each of said arms carrying an anti-friction roll 116. The two anti-friction rolls 116 cooperate with a cam 117 fast on the shaft 32. The lever 115 is pivoted to the frame of the totalizer at 118 and its forward end 119 strikes a plunger 120 slidably mounted in the frames of the totalizers and held in its outer position by a spring (not shown). Upon the rotation of the shaft 32, the cam 117 will act upon the lever 115 to rock the "Tax" totalizer about its pivots 62 and 63, and at the same time, through like mechanism, will rock the "Purchase" totalizer about its pivots. Through this rocking movement the actuating pinions 107 and 110 are carried into operative engagement with their appropriate segments.

Through the operation of the connections above described, it will be noted that upon the operation of one of the dollars keys, the segment 82 will actuate the dollar totalizer element 100 of the "Purchase" totalizer 60. At the same time, through the medium of the pinion 83 shaft 84 and pinion 85, the segment 86 will be actuated to actuate the dimes totalizer element 100 of the "Tax" totalizer 61 a like extent. If a dimes key is depressed it will actuate its segment 89 which will actuate the dimes totalizer element 100 of the "Purchase" totalizer and as the frame 74 for the dimes purchase keys is pinned to the shaft 75, said shaft will be rocked and through the medium of the shaft the rocking movement will be transmitted to the actuator segment 81, thus actuating the penny totalizer element 100 of the "Tax" totalizer a like extent. When one of the penny purchase keys is depressed the segment 78 appropriate to the "Purchase" totalizer will actuate the penny totalizer element 100 of the "Purchase" totalizer and at the same time will actuate the auxiliary actuating element 101 of the "Tax" totalizer through the medium of the segment 76 which is fast on the right hand end of the penny registering frame 74.

*Transfer mechanism and auxiliary actuator of "Tax" totalizer*

When a registering element 100 has made a complete rotation and passes from "9" to "0" the projection 103 of the transfer disk 102 appropriate to that totalizer element will engage the point 130 of a pawl 131, pivoted on a rod 132. Such a pawl 131 is provided adjacent the units of cents and tens of cents totalizer elements 100 of the "Purchase" totalizer and adjacent the units of cents totalizer element 100 of the "Tax" totalizer, and also adjacent the auxiliary actuating element 101 of the "Tax" totalizer. The pawl 131 shown in Figure 5 is the pawl adjacent the auxiliary actuating element of the "Tax" totalizer. The construction of this pawl and the parts controlled thereby are identical with like parts for the regular totalizer elements 100. It will be recalled, however, that the totalizer elements 100 each carry a transfer disk having but one transfer point or projection 103, while the auxiliary actuating element 101 carries a disk 108 having ten transfer points or projections 109.

Each of the pawls 131 is normally held in the position shown in Figure 5 by a spring 135. In this position a notch 136 formed in the upper end of the pawl 131 engages a finger or projection 137 formed on a transfer lever 138 pivotally mounted at 139 on the upper end of a lever 140. The levers 140 are pivoted in the frames of the totalizer concentric with the pivotal points 62 and 63 thereof. The levers 140 extend rearwardly and have at their rear ends anti-friction rolls 141 adapted to cooperate with cams 142 fast on the shaft 32. The levers 138 are normally held in the position shown in Figure 5 by a spring which tends to rock the levers 138 about their pivots so as to lower the rear ends of the levers 138. This rocking movement of the levers 138, however, is prevented by the engagement of the projections 137 with the notches 136 in the pawls 131. Upon the rotation of the shaft 32 the cams 142 will engage the anti-friction rolls 141 carried by the levers 140 and thereby rock the levers 140 about their pivotal points.

As the levers 140 are rocked, it will be noted that the pivotal point 139 of the levers 138 moves clockwise about the pivotal center 63 of the lever 140, as viewed in Fig. 5. This movement will cause the rear end of the lever 138 to move rearwardly of the machine but the projection 137 being in engagement with the notch 136 of the pawl 131, the free end of the lever 138 will be held out of operative engagement with the ratchets 105 of the totalizer elements 100. If, however, one of the elements 100 or the element 101 has been given a movement to cause its appropriate projection 103 or 109 to engage a corresponding projection 130 of the appropriate pawl 131, said pawl will be rocked counter-clockwise about the pivotal center 132, (as viewed in Fig. 5) to cause the notch 136 of the pawl 131 to be disengaged from the projection 137 on the lever 138. The spring bearing against the lever 138 will then be effective to rock the lever about its pivot 139 resulting in the engagement of the free end of the lever with a ratchet 105. Therefore, as the lever 140 is rocked about the center 63 the lever 138 will engage the ratchet 105 and move the totalizer element 100 to which said ratchet is attached the distance of one step or unit.

On the totalizer elements 100, the single projections 103 are so located that they will engage the projections 130 of the pawls 131 as the "0's" of the totalizer elements pass into view at the reading point. In this way, a totalizer element of lower order 100 will, when it passes from "9" to "0" effect a tripping of its appropriate pawl 131, thereby dropping the free end of lever 138 appropriate to the totalizer element of next higher denominational order, so as to permit said lever 138 to engage the ratchets 105 of the totalizer element of next higher order to effect the movement of that totalizer element the distance of one step or unit independently of its appropriate segment.

It will be remembered that the disk 108 of the auxiliary actuator 101 of the "Tax" totalizer is provided with ten projections 109. As a result of this construction, the appropriate pawl 131 will be tripped every time the auxiliary actuator 101 is given a movement regardless of the extent of that movement. This will result in the tripping of the pawl 131 to permit the lever 138 approprate to the penny totalizer element 100 of the "Tax" totalizer to drop into engagement with the ratchet 105 on the units totalizer element, thereby causing the penny totalizer element 100 of the "Tax" totalizer to be given one step of movement independently of its appropriate segment 81 every time the segment 76 is moved.

It will be recalled that the pennies totalizer element of the "Tax" totalizer is moved by its segment 81 an extent equal to the extent of movement given to the dimes totalizer element 100 of the "Purchase" totalizer under the control of its appropriate segment 89.

If the purchase, in addition, involves the adjustment of the segment 78 of the "Purchase" totalizer to record a portion of said purchase or a purchase which is a fraction of 10, that is, involving the operation of any one of the penny keys 20 from "1" to "9" inclusive, the penny totalizer element of the "Purchase" totalizer will be adjusted the proper extent and simultaneous with this adjustment the auxiliary actuating element 101 of the "Tax" totalizer will be given a movement to a like extent. No matter what the extent of this movement may be, the movement of the auxiliary actuating element 101 will effect the giving of an extra step of movement to the penny totalizer element of the "Tax" totalizer through the medium of the mechanism involving the pawl 131, lever 138 and lever 140. Consequently, upon the registration of every amount involving taxable goods, the "Tax" totalizer will be adjusted so that the amount entered thereon will be equal to 1¢ for each 10¢ purchase, and an additional cent for any fraction of 10¢.

By way of illustration, let up suppose that a purchase of 25¢ of taxable goods is to be recorded. The 20 and the 5-cent keys of the series of keys 20 will be depressed. Referring to the "Purchase" totalizer, the segment 78 will be given five steps of movement and consequently move the penny totalizer element 100, of the "Purchase" totalizer five steps. The dime segment 89 will be given two steps of movement, which will result in an adjustment of the dimes totalizer element of the "Purchase" totalizer two steps. Simultaneously with the adjustment of the dimes totalizer element of the "Purchase" totalizer two steps, the penny totalizer element 100 of the "Tax" totalizer will be given two steps of movement under the action of the segment 81 which receives its operating movement through the medium of the shaft to which the segment 81 is pinned, which shaft also has pinned to it the frame 74 for the dimes keys, to which is rigidly connected the segment 89 for the "Purchase" totalizer. As the segment 78 moves five steps to adjust the penny totalizer element of the "Purchase" totalizer five steps, the segment 76 will be moved a like distance through the medium of the frame 74 of the penny keys and consequently the auxiliary actuator 101 for the "Tax" totalizer will be moved five steps. However, the first step of movement of the auxiliary actuator 101 results in the tripping of its appropriate pawl 131 to render the lever 138 effective, so that when the cams 142 come into play to rock the levers 140, the lever 138, which is controlled by the auxiliary actuator 101 will effect an additional movement of the penny totalizer element 100 of the "Tax" totalizer, that is, one step independently of the segment 81.

It is of course to be understood that the elements 100 and 101 of the totalizers are adjusted while the pinions 107 and 110 are in mesh with the actuator segments 76, 81, 86, 78, 89 and 82. As soon as the operating movement of those segments has been completed, the cam 117 is then effective to disengage the totalizers from the segments so as to permit the levers 138 which have been tripped, to effect the additional movements above described.

In so far as the regular transfer from a totalizer element of lower order to a totalizer element of higher order is concerned, this forms no part of the present invention as the mechanism is old and well known in the art and is fully shown and described in the aforesaid Cleal and Carney patents. The use of the auxiliary actuating element 101 in a mechanism similar to the transfer mechanism for giving the additional step of movement to the penny wheel of the "Tax" totalizer is new in the present application and it is by the employment of this mechanism that the automatic registration of a tax equal to 1¢ for each 10¢ of purchase or fraction thereof is made possible.

No-Tax key and indicator

It has hereinbefore been stated that at times it is desired to use the machine shown in the present application for the registration of sales of goods upon which no tax is placed. As the registration of the tax is automatic, it is essential to provide means whereby the "Tax" totalizer will be disabled when a non-taxable sale is made. For this purpose the key 21 is provided with, when pressed in, acts to set up connections which will effect the disabling of the "Tax" totalizer and at the same time effect an indication of the fact that a purchase is being recorded for which no tax is assessable. At the same time, a character which is printed on record material as will be hereinafter described to indicate that the machine has been operated in such a way as to register a tax, will be omitted when the "No tax" key 21 is pressed so that an examination of the printed record will show all of the transactions for which a tax has been assessed and those transactions which have been recorded for which no tax is to be assessed.

The key 21 is carried by a sliding rod 150 slidably mounted in brackets 151 and 152 carried in the frame of the machine. The rod 150 and key 21 are held in outer normal position by a spring 153 interposed between the bracket 152 and a collar 154 carried by the rod 150. Pivotally connected at 155 to the rod 150 is a link 156, the other end of which link is pivoted at 157 (Fig. 1B) to a rod 158 slidably mounted in the brackets supporting the two totalizers. Fast on the rod 158 is an arm 159 (Figs. 1B and 9). The arm 159 is provided with a hole 160 which, when the rod 158 is slid to the left (Figs. 1A and 1B) by pressing inwardly on the key 21, will pass over a pin 161 rigidly mounted on the "Tax" totalizer frame. At the same time, the arm 159 will strike the spring pressed plunger 120 hereinbefore mentioned and force said plunger 120 to the left so as to bring a notch 162 (Fig. 5) formed therein over the end 119 of a counter-engaging lever 115, and consequently, when a key 20 or 23 is depressed, the cam 117 will rock the lever 115 just as hereinbefore described but the end 119 of the lever 115 will enter the notch 162 in the plunger 120 and consequently will not act to move the "Tax" totalizer into engagement with its actuators. The engagement of the hole 160 in the arm 159 with the pin 161 carried by the "Tax" totalizer frame, holds the totalizer frame against any accidental movement at this time toward engaging position. In this manner, the engagement of the "Tax" totalizer with its appropriate segments 76, 81, and 86, will be prevented whenever the "No tax" key 21 is pressed in.

"Tax" and "No tax" indication

In order to indicate publicly whether or not a tax has been registered, an indicating mechanism is provided comprising the following constructions. Mounted on the inner end of the key rod 150 is a bent arm 165 (Fig. 9) carrying a roll 166 which engages a forward curved end 167 of a lever 168 pivoted on the right hand end of the shaft 84. The lever 168 has a flange 177 at its rear end, said flange 177 being provided with a slot 169 (Fig. 1B). Riding in the slot 169 and guided by the guide 46 is a rod 170 pivotally connected at its upper end to an arm 171 fast on a shaft 172, mounted to rock in brackets 173 supported by the frames 27 and 38.

Fast on the shaft 172 is an indicator block 174 which (when in the position shown in Figs. 1A, 1B and 9) bears upon its upper and lower faces the words "No tax." On the vertical faces (not shown) the word "Tax" appears. When the key 21 is in its outer position and one or more of the keys 20 is depressed to record a taxable purchase, the indicator block 174 will remain in the position wherein the word "Tax" will be indicated, both to the front and back of the machine, so as to indicate clearly and publicly that a tax is being automatically registered in connection with the recording of the purchase indicated on the indicators 49, said indicators showing in the small type below the characters 50 the legend 51, showing the word "Tax," together with the proper amount of the tax.

Surrounding the rod 170 is a spring 175 interposed between lugs 176 formed on the rod 170 and the flange 177 of the lever 168. This spring normally tends to hold the flange 177 of the lever 168 in contact with a shoulder 178 carried by the rod 170. When the parts are in the positions shown in Figure 9 the shoulder 178 is held in contact with the guide 46 by a spring 179 interposed between the rear end of the lever 168 and a pin carried by the bail 53. In this manner the rear end of the lever 168 is held in its lower position which will tend to hold the shoulder 178 of the rod 170 against the guide 46. At its lower end the rod 170 is formed with a foot 180 which cooperates with the bail 53, hereinbefore described, for the purpose of holding the rod 170 in the position shown in Fig. 9 when a tax is automatically registered, or in other words when the key 21 is not pressed.

When the "No tax" key 21 is pressed inwardly on a transaction for which no tax is assessable the roll 166 engaging the curved forward end 167 of the lever 168 will cause the lever 168 to rock in a counter-clockwise direction about the shaft 84. This will elevate the flange 177 of the lever 168 thereby compressing the spring 175. Upon the operation of one of the pivoted key levers the bail 53 will be rocked by mechanism described in the aforesaid Cleal patent. It will be remembered that the bail 53, as just above stated, normally engages the foot 180 of the rod 170 between operations of the machine and on "Tax" transactions holds the rod in the position shown in Fig. 9. When the spring 175 is compressed it will exert an upward pressure on the rod 170, which pressure however is restrained by the bail 53. When one of the key levers is pressed to rock the bail 53 the spring 175 will then be free to force the rod 170 upwardly, and, through the connections of the rod 170 with the arm 171 fast on a shaft 172, the latter will be rocked, thereby rocking the indicator block 174 in a counter-clockwise direction, as viewed in Fig. 9, bringing the words "No tax" in vertical position to the front and back of the machine. Upon a completion of the downward pressure of the pivoted key on the levers the bail 53 will then lock under the foot 180 thereby holding the rod 170 in elevated position.

In a machine of this type suitable mechanism is provided for locking the key 21 and its rod 150 in the inner position when pressed inwardly. This mechanism however forms no part of the present invention but is fully shown and described in the aforesaid Cleal patent and reference may be had thereto for a detailed description of such a locking mechanism. It is sufficient to state that when one of the key levers 20 and 23 is fully depressed the key 21 and its rod 150 will be released and under the action of the spring 153 the key will be forced outwardly thereby returning the key 21 and the rod 150 to normal positions. The pressure of the roll 166 against the curved forward end 167 of the lever 168 will then be removed and the spring 179 will then tend to draw the rear end of the lever 168 downwardly. As the flange 177 of the lever 168 is then resting on the shoulder 178 on the rod 170 the spring 179 is restrained from so acting. When however upon the succeeding operation of the machine a tax is to be automatically registered the key 21 is not pressed in. Consequently when a key lever is operated the bail 53 is rocked out of engagement from the foot 180 of the rod 170 thereby permitting the spring 179 to act to lower the rear end of the lever 168, pulling the rod 170 downwardly to the position shown in Fig. 9. This will rock the shaft 172 and indicator block 174 clockwise to the position shown in Fig. 9 in which position the word "Tax" will be indicated both to the front and rear of the machine.

Printing mechanism

For the purpose of printing upon a detail record strip, to be retained within the machine, the amount of the purchase together with a character to show when a tax has been automatically registered, the movements of the registering segments for the purchase totalizer are transmitted to printing wheels 181 for printing the amount of the purchase (Figs. 1B and 3).

In addition to the printing elements 181 there is provided a printing element 182 for printing a character just to the right of the amount of a purchase as indicated by the reference numeral 183 (Fig. 4).

The printing wheel 182 is differentially adjusted under the control of the keys 22, 23, 24 and 25. As the mechanism for adjusting this printing wheel does not enter into the present invention the connecting mechanism has not been shown and described in detail herein. Reference may be had to the hereinbefore mentioned Cleal patent for a detailed description of the operating mechanism.

There is provided a printing wheel 184 which bears a single raised type for printing the character "T" as shown at 185 on the portion of the detail strip in Fig. 4. The connections for adjusting the printing wheels 181 and the printing wheel 184 will be later described.

It will be recalled that the movements of the actuator segments 78, 89 and 82 are conveyed through suitable connections to the actuator segments 76, 81 and 86 at the right hand end of the machine. The left hand segment 86 meshes with a pinion 190 (Fig. 1B) fast on the left hand end of a shaft 191 which extends to the right through the right hand side frame 38 and has fast to its right hand end the printing wheel 181 which is the right hand or dollar wheel. The segments 76 and 81 mesh with similar pinions 190 fast on the left hand ends of a pair of telescopic sleeves 192 carried by the shaft 191. The sleeves extend to the right through the right hand side frame 38 and have fast to the right hand ends the pennies and dimes printing wheels 181. In this manner the movements given to the segments 76, 81 and 86 are transmitted to the printing wheels 181 so that when the keys 20 are depressed representing the amount of the purchase, the printing wheels 181 are adjusted so that the type representing the amount of the purchase are brought to printing position.

Referring to Fig. 9 it will be noted that the arm 165 carried by the rod 150 of the "No tax" key is formed at a right angle at its upper end, and in its rearwardly extending portion is formed with a notch engaging a roll 193 carried by an arm 194 fast on the left hand end of the outermost sleeve 192. This sleeve 192 extends to the right through the side frame 38 and has fast on its right hand end the printing wheel 184 which bears the single character "T". When the key 21 is in its outermost position and the keys 20 are operated representing a purchase which is taxable, the character "T" is in printing position. When no tax is to be recorded and the key 21 is pressed inwardly the arm 194 is rocked clockwise (Fig. 9), thereby rocking the outermost sleeve 192 and the printing wheel 184 in a like direction to carry the character "T" out of printing position. Consequently when the amount of the sale is registered no character "T" is printed indicating that no tax has been recorded in connection with the amount of the purchase. Such a transaction is indicated at 188 (Fig. 4).

Just beneath the type wheels 181, 182 and 184 is a platen 200 (Fig. 3) for taking an impression, from the raised type of the printing wheels upon a detail strip 201. The platen 200 is carried on the forward end of an arm 202 pivoted at 203 on a sub-frame 204 mounted on the right hand side frame 38, the sub-frame 204 serving to support all of the parts of the printing mechanism.

Mounted on the right hand end of the shaft 32 is a scroll cam 205 which cooperates with a projection 206 carried by the platen arm 202. Interposed between the arm 202 and a lug 207 on the printer frame 204 is a spring pressed-plunger 208 which serves to hold the projection 206 of the platen arm 202 in contact with the periphery of the scroll cam 205. The shaft 32, it will be recalled, is rotated counter-clockwise (as shown by the arrow in Fig. 3) and it is obvious that as the shaft 32 rotates, the portion of the scroll cam 205 of increasing radius will serve to rock the platen arm 202 counter-clockwise about its pivot 203, until the cam 205 reaches its point of greatest radius. At this time the partial or registering stroke of the forward keys 20 will have been completed and the wheels 181, 182 and 184 have then been adjusted to the proper printing positions. Then upon a continued rotation of the shaft 32 the high point of the scroll cam 205 will pass the projection 206 of the platen arm 202, thereby permitting the spring-pressed plunger 208 to act to throw the platen 200 against the adjusted type of the type wheels, thereby causing an impression to be made on the detail strip 201.

The detail strip 201 is led from the supply roll 209 about two studs 210 on the printer frame 204 to a receiving roll 211. The receiving roll 211 has fast on its left hand end a ratchet wheel 212. Cooperating with the ratchet wheel 212 is a hooked arm 213 having its hook 214 held in engagement with the ratchet 212 by a spring 215. The arm 213 is pivotally mounted upon an arm 216 fast on the right hand end of the trunnion 29 of the key coupler 28. Consequently the arm 216 receives a reciprocating movement on the reciprocating movement of the key coupler 28. This reciprocating movement of the arm 216 acts through the arm 213 pivoted thereon to rotate the ratchet 212 and receiving roll 211 the distance of one tooth of the ratchet 212 in a counter-clockwise direction. A spring held pawl 217 is provided and normally cooperates with the ratchet 212 to prevent retrograde movement of the receiving roll 211. Consequently the detail strip is adjusted a single space at each operation of the machine so that the printed items are printed successively on the detail strip (Fig. 4) in the order that they are entered on the "Purchase" totalizer.

An inking ribbon 218 is provided for giving a properly inked impression on the detail strip 201. The ink ribbon 218 is a continuous ribbon passing about an ink roll 219, a guide stud 220, a guide roll 221 and a roll 222 on a stud 223. In order to keep the proper tension on the ink ribbon 218 a roll weight 224 carried by a frame 225 is provided. The frame 225 is pivoted on a stud 226 carried by the printer frame 204. This weight constantly bears on the ribbon 218 and holds the ribbon taut (Fig. 3).

For holding the type wheels in position while an impression is being taken, each of the type wheels has fast to its side a star disk 227. The star disks 227 have cooperating therewith a series of aligning fingers 228 pivotally mounted at 229 in a frame 230 pivoted on the stud 223. Springs 231 are provided for holding the fingers 228 yieldingly in contact with the star disks 227 when they are thrown into engagement therewith. For the purpose of throwing the fingers 228 into engagement with the star wheels 227 the frame 230 is formed with a double arm 232 which cooperates with a cam 234 fast on the shaft 32. The cam 234 is so formed that at the proper time during the rotation of the shaft 32 which is immediately upon the completion of the adjusting stroke of the type wheels, it will be effective to rock the frame 230 through the medium of the arm 232 to engage the aligning fingers 228 with the notches formed in the star disks 227. After an impression is taken by the platen 200 and before the keys start on the return stroke, the frame 230 is rocked clockwise (Fig. 3) to disengage the aligning fingers 228 from the notches in the star disks 227.

It will thus be seen from the above description that whenever a taxable purchase is to be recorded on the "Purchase" totalizer a character "T" will be printed upon the detail strip to the right of the amount representing the amount of the purchase. At the same time the amount of the tax will be automatically registered on the "Tax" totalizer and the indicator block 174 will indicate the word "Tax" thereby indicating that a tax has been registered. When a non-taxable purchase is made the amount of the purchase is properly registered upon the "Purchase" totalizer and is printed on the detail strip. No tax is registered on the "Tax" totalizer. The type wheel 184 carrying the character "T" however will be adjusted so that no character will be printed upon the detail strip thereby indicating that no tax has been registered. At the same time the indicator 174 will have been adjusted to bring the words "No tax" to vertical positions both on the front and rear of the indicator 174 so as to indicate publicly that no tax has been registered in connection with the purchase.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of a plurality of totalizers, a group of actuators for each of said totalizers, each actuator having a determined numerical order, item entering means differentially actuating said actuators simultaneously, and connections intermediately of the two sets of actuators whereby actuators of unlike numerical order will receive movement in unison.

2. In a machine of the class described, the combination of a plurality of totalizers, a group of actuators for each of said totalizers, item entering means common to all of said groups of actuators for controlling the extent of actuation of the totalizers, and connections intermediate of the groups of actuators whereby the actuators of one group are operatively connected to and control the actuators of unlike numerical order of another group, so that the totalizers appropriate to said groups will be simultaneously actuated to unlike extents.

3. In a machine of the class described, the combination of two totalizers, a group of actuators for each of said totalizers, each actuator of each group having a determined numerical order, and connections intermediate of the actuators of one group and actuators of different numerical order of the other group, whereby some of the elements of one totalizer will be actuated to an extent proportionate to the extent of actuation of the elements of different orders of the other totalizer.

4. In a machine of the class described, the combination of two totalizers, a group of actuators for each totalizer, item entering means common to both groups of actuators for controlling the entry of amounts upon said totalizers, and rigid connections intermediate of certain of the actuators of one group and actuators of the other group of unlike numerical order, whereby the amount represented by the actuated item entering means is entered on one totalizer and a certain proportion of said amount is added on the other totalizer.

5. In a machine of the class described, the combination of two totalizers, item entering means controlling the extent of actuation of the two totalizers, a group of actuators for each of said totalizers, and positive connections intermediate of certain actuators of said two groups of actuators whereby the amount added upon one of said totalizers by said actuators will always represent a definite portion of the amount added upon the other of said totalizers by said actuators.

6. In a machine of the class described, the combination of two totalizers, a group of actuators for each of said totalizers, item entering means for controlling the movement of one group of actuators and connections intermediate of the two groups of actuators and independent of said item entering means so arranged that the totalizers may be actuated to unlike extents.

7. In a machine of the class described, the combination of a totalizer comprising a plurality of totalizer elements, each appropriate to a certain numerical order, a group of actuators for said totalizer each actuator appropriate to a certain numerical order, a group of keys for each actuator to control the same, means for engaging the totalizer with the actuators to establish a cooperative relation between the actuators and totalizer elements, an additional group consisting of a plurality of digit keys and an additional actuator controlled differentially by said digit keys as to its extent of movement and adapted to give an additional uniform extent of movement to the units totalizer element.

8. In a machine of the class described, the combination of two totalizers, a group of actuators for each of said totalizers, item entering means, and connections intermediate of said item entering means and one group of actuators whereby an amount appropriate to the value of the operated item entering means will be entered upon one of said totalizers, and connections independent of said item entering means connecting the two groups of actuators whereby an amount representing a portion of the amount entered upon said totalizer will be entered simultaneously upon the other of said totalizers.

9. In a machine of the class described, the combination of a plurality of totalizers, means for actuating certain elements of one totalizer simultaneously and to like extents with elements of another totalizer, and means for additionally actuating one of said first mentioned elements to like or unlike extents with another element of said second totalizer.

10. In a machine of the class described, a totalizer, actuators therefor movable to extents commensurate with the respective digits of the amounts to be entered, and means whereby one of the actuators will control the entry of amounts in the totalizer disproportionate to the extent of actuation of said actuator.

11. In a machine of the class described, a plurality of totalizers, key driven totalizer actuators for each of said totalizers, and means whereby an actuator of one of said totalizers will operate to enter a constant amount into a totalizer element directly operated by another actuator.

In testimony whereof I affix my signature.
BERNIS M. SHIPLEY.